(12) United States Patent
Chen et al.

(10) Patent No.: US 10,280,111 B2
(45) Date of Patent: May 7, 2019

(54) ENERGY-SAVING GLASS AND METHOD OF MANUFACTURING THE SAME

(71) Applicant: National Tsing Hua University, Hsinchu (TW)

(72) Inventors: Yu-Bin Chen, Tainan (TW); Fu-Yuan Shih, Lukang Township, Changhua County (TW); Yung-Chun Lee, Taipei (TW); Wei-Xiang Su, Houlong Township, Miaoli County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 52 days.

(21) Appl. No.: 15/601,569

(22) Filed: May 22, 2017

(65) Prior Publication Data

US 2017/0334772 A1 Nov. 23, 2017

(30) Foreign Application Priority Data

May 23, 2016 (TW) .............................. 105116018 A

(51) Int. Cl.
| | |
|---|---|
| *C03C 17/36* | (2006.01) |
| *C03C 17/40* | (2006.01) |
| *C03C 17/34* | (2006.01) |
| *C03C 3/04* | (2006.01) |

(Continued)

(52) U.S. Cl.
CPC .......... *C03C 17/3639* (2013.01); *C03C 3/045* (2013.01); *C03C 4/0085* (2013.01); *C03C 4/082* (2013.01); *C03C 17/34* (2013.01); *C03C 17/36* (2013.01); *C03C 17/3602* (2013.01); *C03C 17/40* (2013.01); *C03C 2217/425* (2013.01); *C03C 2218/33* (2013.01); *C03C 2218/34* (2013.01)

(58) Field of Classification Search
None
See application file for complete search history.

(56) References Cited

U.S. PATENT DOCUMENTS 5,162,145 A * 11/1992 Schaefer ........... B32B 17/10036
428/209
5,796,071 A * 8/1998 Morin .................... C03C 17/008
219/203

(Continued)

FOREIGN PATENT DOCUMENTS

| | | |
|---|---|---|
| CN | 1128320 A | 8/1996 |
| TW | I402240 B1 | 7/2013 |

*Primary Examiner* — David Sample
(74) *Attorney, Agent, or Firm* — Birch, Stewart, Kolasch & Birch, LLP

(57) ABSTRACT

An energy-saving glass includes a glass substrate, and a periodic metal layer deposited on the glass substrate and having a honeycomb array of round holes. A method of manufacturing the energy-saving glass includes: providing a template having multiple template spots arranged in a honeycomb array; forming on the template a transfer metal layer having multiple metal spots disposed respectively on the template spots; transferring the metal spots onto a photoresist layer on a glass substrate; etching the photoresist layer exposed from the metal spots to leave photoresist spots underlying the metal spots on the glass substrate; forming a periodic metal layer around the photoresist spots; and removing the photoresist spots.

11 Claims, 14 Drawing Sheets

(51) Int. Cl.
*C03C 4/00* (2006.01)
*C03C 4/08* (2006.01)

(56) References Cited

U.S. PATENT DOCUMENTS

| | | | |
|---|---|---|---|
| 6,208,071 B1* | 3/2001 | Nishimura | C03C 17/06 |
| | | | 313/310 |
| 2004/0142252 A1* | 7/2004 | Skrobis | C03C 15/00 |
| | | | 430/5 |
| 2012/0015164 A1 | 1/2012 | Lin et al. | |
| 2015/0107660 A1* | 4/2015 | Kempa | H01L 31/02168 |
| | | | 136/256 |
| 2015/0364898 A1* | 12/2015 | Meng | H01S 5/0425 |
| | | | 372/40 |

* cited by examiner (a)

(b)

ENERGY-SAVING GLASS AND METHOD OF MANUFACTURING THE SAME

CROSS-REFERENCE TO RELATED APPLICATION

This application claims priority of Taiwanese Patent Application No. 105116018, filed on May 23, 2016.

FIELD

The disclosure relates to a glass, and more particularly to an energy-saving glass and a method of manufacturing the same.

BACKGROUND

There are mainly three types of conventional energy-saving glasses, which are film-attached glass, laminated glass, and double-layered glass. The film-attached glass is made by attaching an energy-saving film, such as a heat reflecting or absorbing film, to a glass substrate. The laminated glass is made by disposing an energy-saving adhesive between two glass substrates. The double-layered glass is made by forming a vacuum space between two glass substrates, in which the vacuum space can block heat transfer and may receive an energy-saving film therein for better energy-saving performance.

The energy-saving film and energy-saving adhesive can absorb or reflect infrared and ultraviolet lights, and allow visible light to pass therethrough to achieve the purpose of energy-saving. The material and the thickness of the energy-saving film and energy-saving adhesive may be changed according to practical requirements. However, the thickness only affects the absorbing efficiency, and the wavelength of the light that is to be absorbed is determined by the material of the energy-saving film and energy-saving adhesive.

Another conventional energy-saving glass includes a glass substrate and a periodic metal layer formed thereon. A common design of the periodic metal layer is to form a two dimensional matrix composed of a plurality of metal squares. As a result, there are six factors affecting the properties of the periodic metal layer, i.e., the material and the thickness of the periodic metal layer, the length of each of the metal squares, the width of each of the metal squares, the spacing between adjacent two of the metal squares in the lengthwise direction, and the spacing between adjacent two of the metal squares in the widthwise direction. In practice, before the glass is manufactured, a simulating calculation will be conducted based on the aforesaid factors to determine the energy-saving efficiency. However, the multiple factors may impose complexity or even difficulty in simulating calculation. Moreover, the sharp corners of the metal squares may not be properly manufactured, and may lead to deficiency of the metal squares.

SUMMARY

Therefore, the present disclosure is to provide an energy-saving glass and a method of manufacturing the same that can alleviate at least one of the drawbacks associated with the prior art.

According to one aspect of the present disclosure, an energy-saving glass includes a glass substrate and a periodic metal layer. The periodic metal layer is deposited on the glass substrate and has a honeycomb array of round holes.

According to another aspect of the present disclosure, a method of manufacturing an energy-saving glass includes the steps of:

(a) providing at least one template having a plurality of template spots that are arranged in a honeycomb array;

(b) forming on the template a transfer metal layer that has a plurality of metal spots disposed respectively on the template spots;

(c) forming on a glass substrate a photoresist layer;

(d) transferring the metal spots from the template spots onto the photoresist layer;

(e) etching the photoresist layer exposed from the metal spots such that photoresist spots respectively underlying the metal spots are left on the glass substrate and ring-shaped spaces are formed on the glass substrate around the photoresist spots;

(f) forming by deposition a periodic metal layer on the glass substrate such that the periodic metal layer fills the ring-shaped spaces; and (g) removing the photoresist spots and the metal spots so as to form a honeycomb array of round holes.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
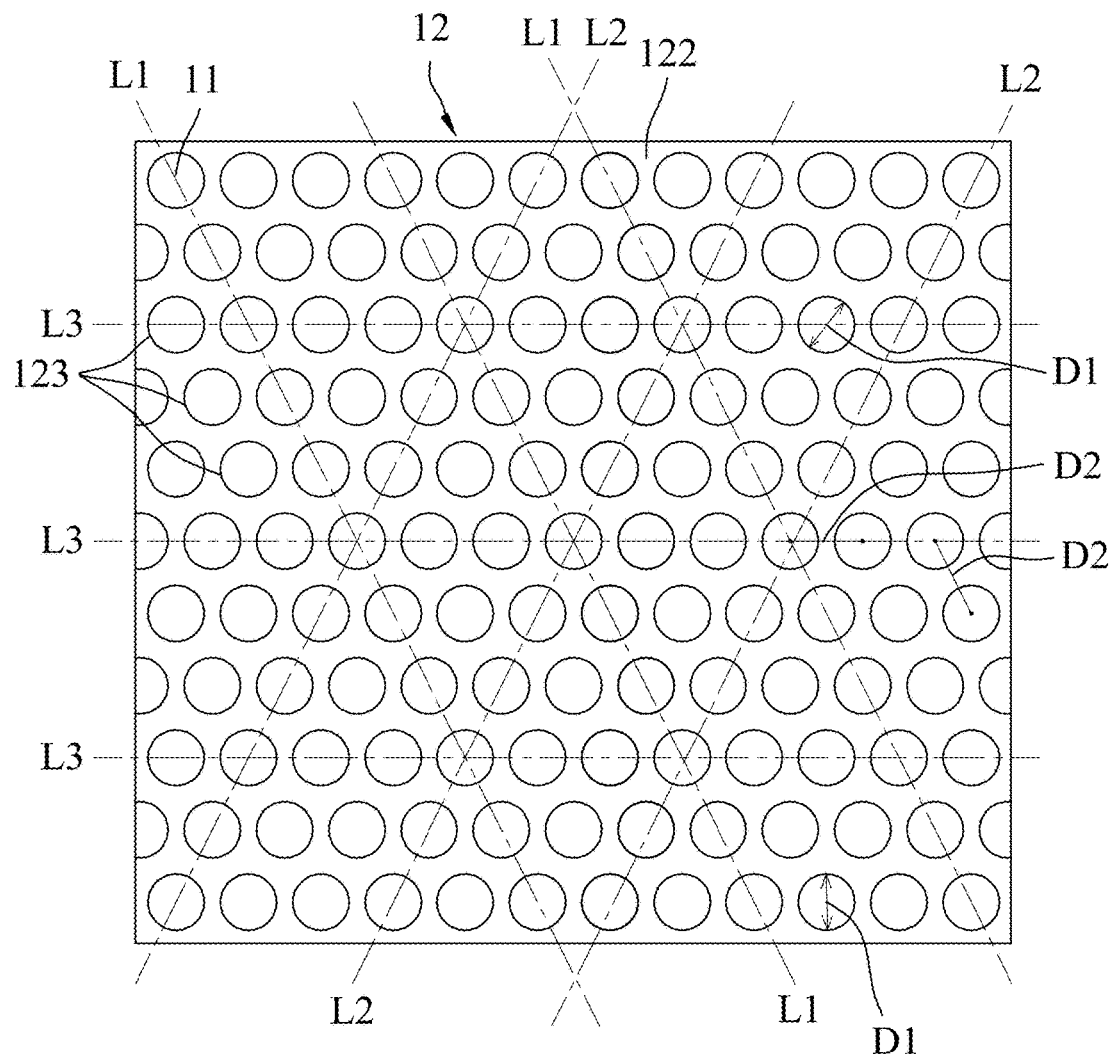
FIG. 1 is a schematic top view of an exemplary embodiment of an energy-saving glass having a honeycomb array of round holes of this disclosure.
Figure 2:
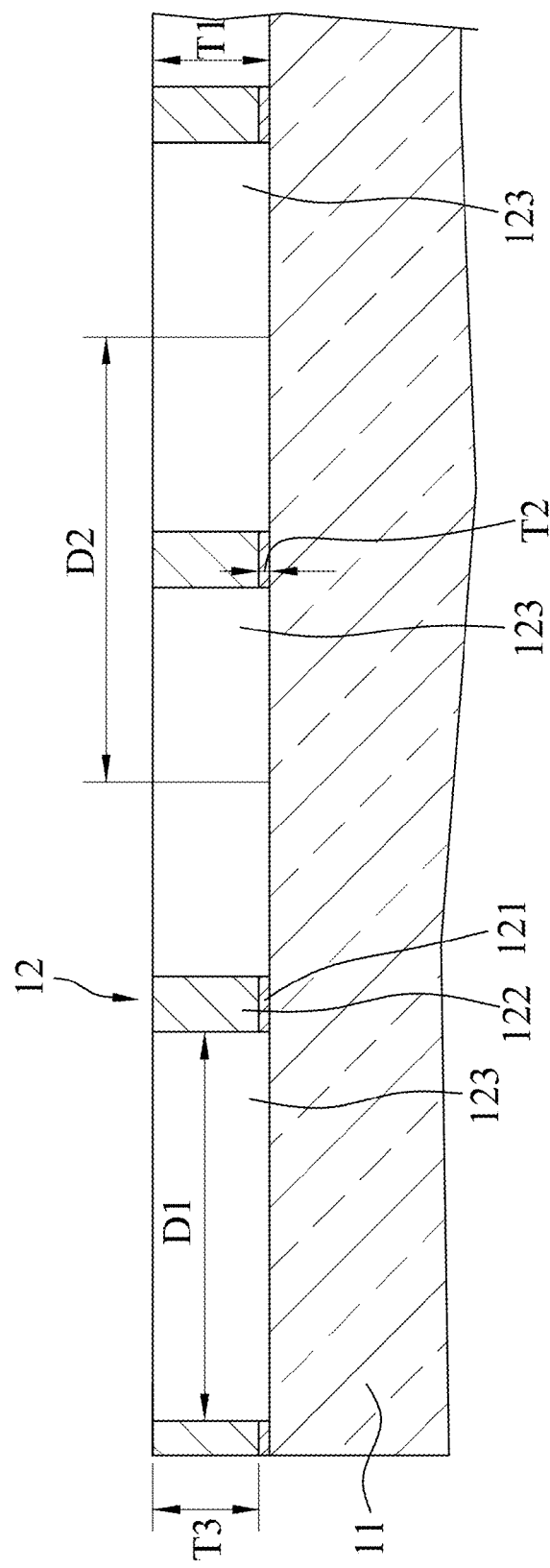
FIG. 2 is a fragmentary sectional view of the exemplary embodiment.
Figure 3:
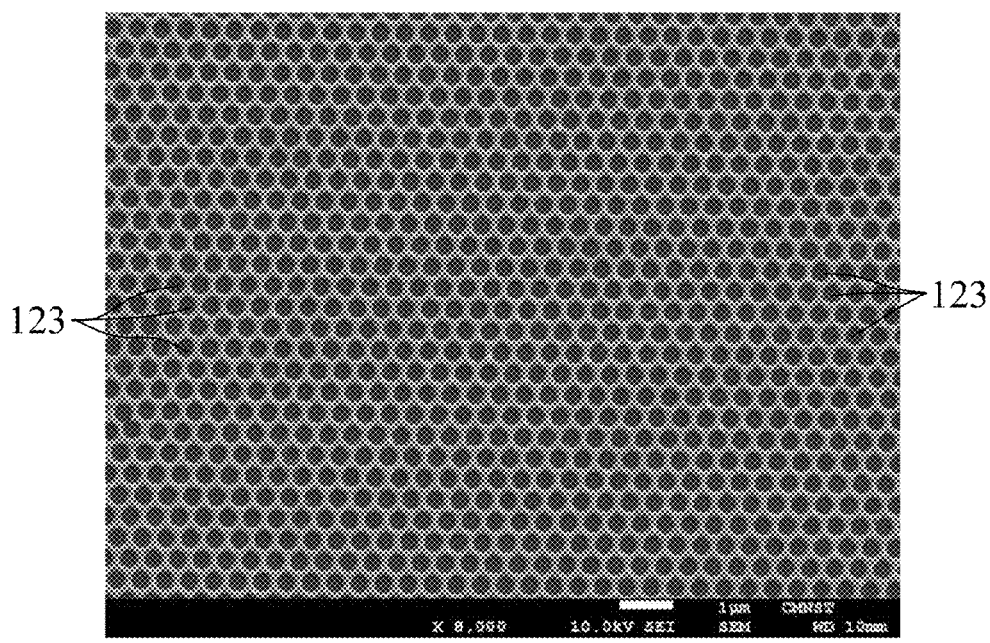
FIG. 3 is an image of the exemplary embodiment taken by a scanning electron microscope (SEM)

Referring to FIGS. 1 to 3, an exemplary embodiment of an energy-saving glass according to the present disclosure includes a glass substrate 11 and a periodic metal layer 12.

The thickness of the glass substrate 11 may be changed according to practical requirements, such as application to vehicles or buildings. In this embodiment, the thickness of the glass substrate 11 is 3 mm.

The periodic metal layer 12 is deposited on the glass substrate 11 and has a honeycomb array of round holes 123.

To be more specific, the round holes 123 are arranged and aligned along parallel first lines (L1), parallel second lines (L2) and parallel third lines (L3). The first, second and third lines (L1, L2, L3) lie in a plane. The first lines (L1) intersect the second lines (L2) and the third lines (L3). Only three of the first lines (L1), three of the second lines (L2) and three of the third lines (L3) are shown in FIG. 1 for illustrative purpose. Each of the round holes 123 is located at an intersection of one of the first lines (L1), one of the second lines (L2) and one of the third lines (L3).

In certain embodiments, the periodic metal layer 12 has a thickness (T1) ranging from 88 nm to 112 nm. In this embodiment, the thickness (T1) of the periodic metal layer 12 is exemplified to be 100 nm. In certain embodiments, the periodic metal layer 12 further has a first metal sub-layer 121 disposed on the glass substrate 11, and a second metal sub-layer 122 disposed on the first metal sub-layer 121. The first metal sub-layer 121 may be made of one of chromium and titanium, and has a thickness (T2) ranging from 8 nm to 12 nm. The second metal sub-layer 122 may be made of gold, and has a thickness (T3) ranging from 80 nm to 100 nm. In this embodiment, the first metal sub-layer 121 is exemplified to be made of chromium and the thickness (T2) of the first metal sub-layer 121 is exemplified to be 10 nm. The thickness (T3) of the second metal sub-layer 122 is exemplified to be 90 nm.

The first metal sub-layer 121 and the second sub-layer 122 cooperatively define the round holes 123. In certain embodiments, each of the round holes 123 has a diameter (D1) ranging from 315 nm to 385 nm, and a center-to-center distance (D2) of two adjacent ones of the round holes 123 ranges from 405 nm to 495 nm. In this embodiment, the diameter (D1) of each of the round holes 123 is exemplified to be 350 nm, and the center-to-center distance (D2) of two adjacent ones of the round holes 123 is exemplified to be 450 nm.

When the diameter (D1) of each of the round holes 123 is made larger or the shortest distance between two adjacent ones of the round holes 123 is made smaller, the transmittance of visible light is increased, but the transmittance of infrared light is also increased, which is undesirable since the infrared light will increase room temperature. On the other hand, when the diameter (D1) of each of the round holes 123 is made smaller or the shortest distance between two adjacent ones of the round holes 123 is made larger, the transmittance of infrared light is decreased, but the transmittance of visible light is also decreased, which is undesirable since extra lighting may be needed to maintain indoor lighting. As a result, the diameter (D1) of each of the round holes 123 is controlled to be in a range from 315 nm to 385 nm, and the center-to-center distance (D2) of two adjacent ones of the round holes 123 is controlled to be in a range from 405 nm to 495 nm.

The second metal sub-layer 122 of the periodic metal layer 12 of the energy-saving glass reflects a large portion of incident infrared light, and allows a large portion of incident visible light to pass therethrough to achieve the energy-saving function. The first metal sub-layer 121, which is made of one of chromium and titanium, has good adhesion to both the gold of the second metal sub-layer 122 and the glass substrate 11, so that the periodic metal layer 12 may be firmly attached to the glass substrate 11. Moreover, since gold is a rather inert metal that does not easily react with other chemicals, the second metal sub-layer 122 is unlikely to be destroyed or change in property and thickness. Thus, a further protective layer formed on the second metal sub-layer 122 could be eliminated, and the problem caused by thickness change could also be prevented.

Figure 4:
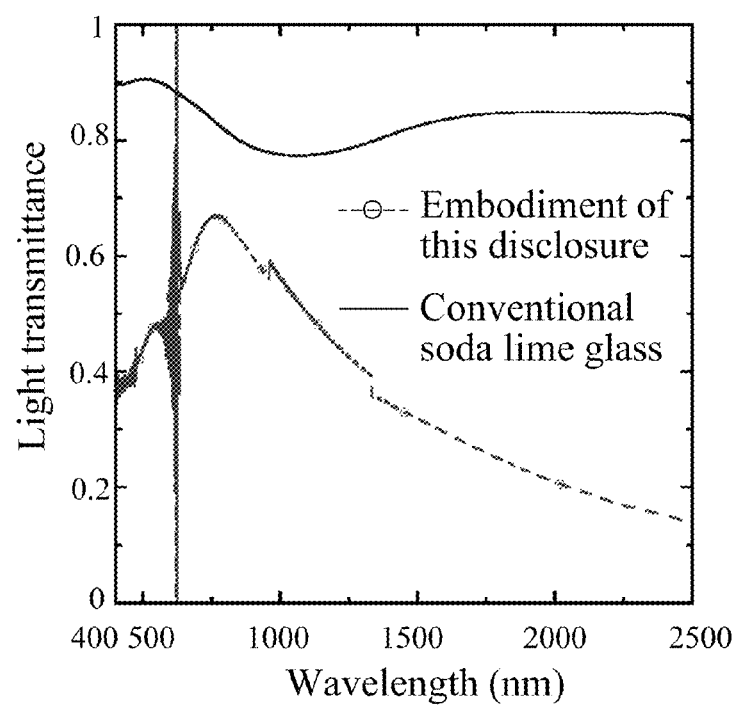
FIG. 4 is a diagram showing light transmittance at different wavelengths of the exemplary embodiment and a conventional soda lime glass.

FIG. 4 shows light transmittance at different wavelengths of the exemplary embodiment and a conventional soda lime glass. Compared to the conventional soda lime glass, the exemplary embodiment of this disclosure has lower infrared transmittance but still has a desired visible light transmittance.

Tables 1-1 and 1-2 show the different values related to thermal resistance and reflectivity of the exemplary embodiment of the energy-saving glass and various conventional glasses. The lesser the overall thermal transmission amount, the U-value and the shading coefficient, the better the energy-saving effect. As shown in Tables 1-1 and 1-2, the exemplary embodiment has superior overall thermal transmission amount, U-value and shading coefficient.

It is worth mentioning that the overall transmittance is the sum of the direct light transmission through the glass plus the secondary heat emission through radiation and convection. As shown in Tables 1-1 and 1-2, the exemplary embodiment of the energy-saving glass has low absorptance and transmittance and high reflectivity, thereby resulting in a low overall transmittance and low overall thermal transmission amount. On the other hand, although the reflective glass has low transmittance, the absorptance thereof is higher than that of the exemplary embodiment, which would result in high secondary heat emission. Therefore, the overall transmittance and the overall thermal transmission amount of the reflective glass are higher than those of the exemplary embodiment.

TABLE 1-1

| Glass Types | thickness (mm) | Reflectivity (%) | Absorptance (%) | Transmittance (%) |
|---|---|---|---|---|
| Energy-saving Glass of this Embodiment | 3 | 39 | 12 | 49 |
| Soda Lime Glass | 4 | 7 | 10 | 83 |
| Reflective Glass | 6 | 13 | 48 | 39 |
| Low-E Insulating Glass | 24 | 17 | 49 | 34 |
| Pilkington K Glass ™ | 6 | 15 | 30 | 55 |
| Low-E Single Glazing Glass | 6 | — | — | — |

TABLE 1-2

| Glass Types | Overall Transmittance (%) | Overall Thermal Transmission Amount (W/m$^2$) | U-Value (W/m$^2$K) Winter Night | U-Value (W/m$^2$K) Summer Daytime | Shading Coefficient |
|---|---|---|---|---|---|
| Energy-saving Glass of this Embodiment | 51 | 395 | 4.12 | 3.64 | 0.58 |
| Soda Lime Glass | 85 | 657 | 5.87 | 5.29 | 0.98 |
| Reflective Glass | 54 | 431 | 5.7 | 4.13 | 0.62 |
| Low-E Insulating Glass | 43 | 328 | 1.82 | 1.82 | 0.5 |
| Pilkington K Glass ™ | 68 | — | — | — | 0.78 |
| Low-E Single Glazing Glass | — | — | 4.17 | 3.62 | 0.82 |

Compared to the conventional energy-saving glasses with obtuse or right angles, the exemplary embodiment of the energy-saving glass of this disclosure has a round hole design, thereby alleviating the problems caused by corners during manufacturing of the conventional energy-saving glasses. With the periodic metal layer 12 having the honeycomb array of round holes 123 arranged and aligned along the three intersecting lines (L1, L2, L3) lying in a two dimensional plane, the number of the factors affecting the design of the periodic metal layer 12 would be decreased to four, which are the material and the thickness (T1) of the periodic metal layer 12, the diameter (D1) of each of the round holes 123, and the center-to-center distance (D2) of two adjacent ones of the round holes 123, thereby alleviating the complexity or difficulty in design of the energy-saving glasses.

Figure 5:
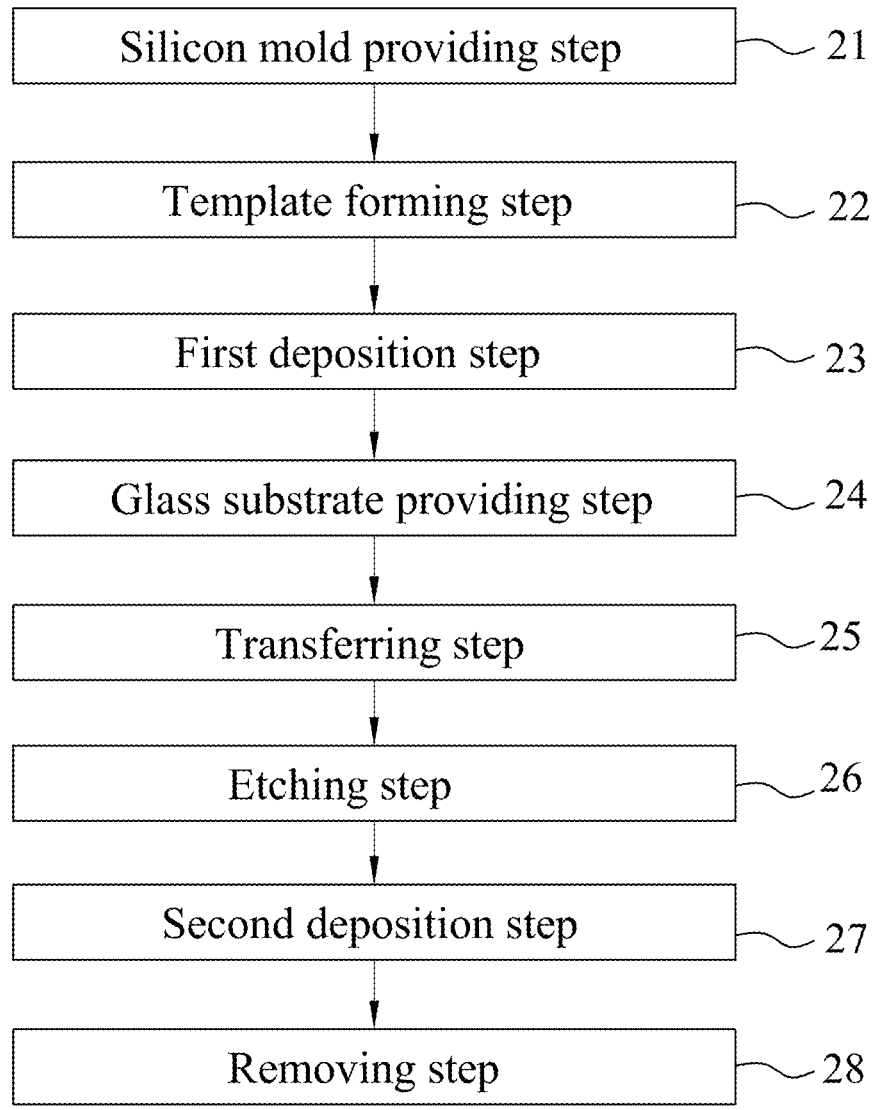
FIG. 5 is a flow chart showing a method of manufacturing the exemplary embodiment.

FIG. 5 is a flow chart showing a method of manufacturing the exemplary embodiment of the energy-saving glass according to the present disclosure. It should be noted that FIGS. 6 to 14 are for illustrative purposes only, and the scope of this invention is not limited thereto.

The method of manufacturing the exemplary embodiment includes: a silicon mold providing step 21, a template forming step 22, a first deposition step 23, a glass substrate providing step 24, a transferring step 25, an etching step 26, a second deposition step 27 and a removing step 28.

Figure 6:
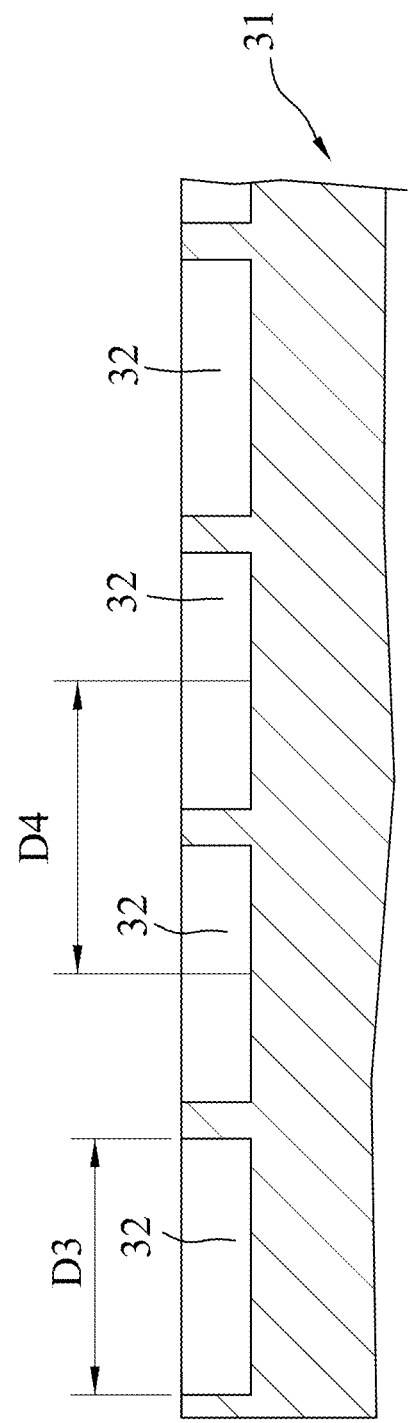
FIG. 6 is a fragmentary sectional view of a silicon mold used in the method of manufacturing the exemplary embodiment.

Referring further to FIG. 6, in the silicon mold providing step 21, a silicon mold 31 having a plurality of cavities 32 is provided. The cavities 32 are in a honeycomb array and are arranged and aligned along parallel first lines, parallel second lines and parallel third lines. The first, second and third lines lie in a plane. Each of the cavities 32 is located at intersection of one of the first lines, one of the second lines and one of the third lines, has a circular horizontal cross section, and has a diameter (D3) ranging from 315 nm to 385 nm. In this embodiment, the diameter (D3) of each of the cavities 32 is exemplified to be 350 nm. A center-to-center distance (D4) of two adjacent ones of the cavities 32 ranges from 405 nm to 495 nm, and, in this embodiment, is exemplified to be 450 nm.

Figure 7:
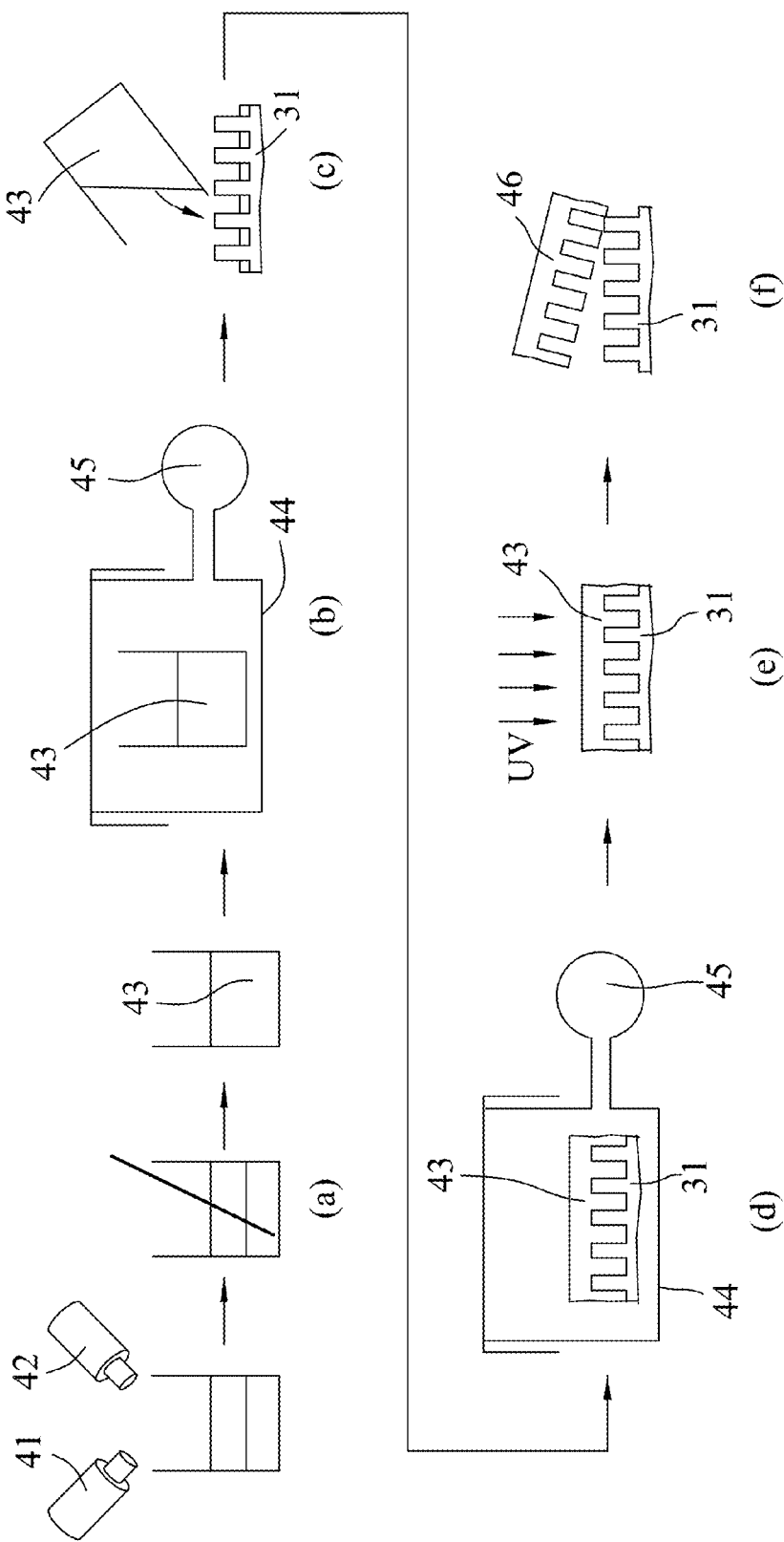
FIG. 7 shows consecutive steps of manufacturing the silicon mold.

Referring to FIGS. 5 and 7, in the template forming step 22, a chemical kit which includes polydimethylsiloxane (PDMS) and has first and second agents 41, 42, was purchased from Dow Corning Corp. (Catalog No. Sylgard® 184). As shown in part (a) of FIG. 7, the first agent 41 and the second agent 42 are evenly mixed to form a polymer solution 43. Then, as shown in part (b) of FIG. 7, the polymer solution 43 is placed in a container 44 and degassed using a pump 45 so as to remove bubbles from the polymer solution 43. The polymer solution 43 is then poured onto the silicon mold 31 (see part (c) of FIG. 7), followed by placing the polymer solution 43 and the silicon mold 31 in the container 44 to remove bubbles (degassing) from the polymer solution 43 using the pump 45 (see part (d) of FIG. 7). As shown in part (e) of FIG. 7, the polymer solution 43 is cured by cross-linking using UV light so as to form a template 46. As shown in part (f) of FIG. 7, finally, the template 46 is released from the silicon mold 31. In this embodiment, the template 46 is exemplified to be a soft template. It is worth mentioning that the degassing process using the pump 45 will make the template 46 thus obtained have better quality and higher density.

Figure 8:
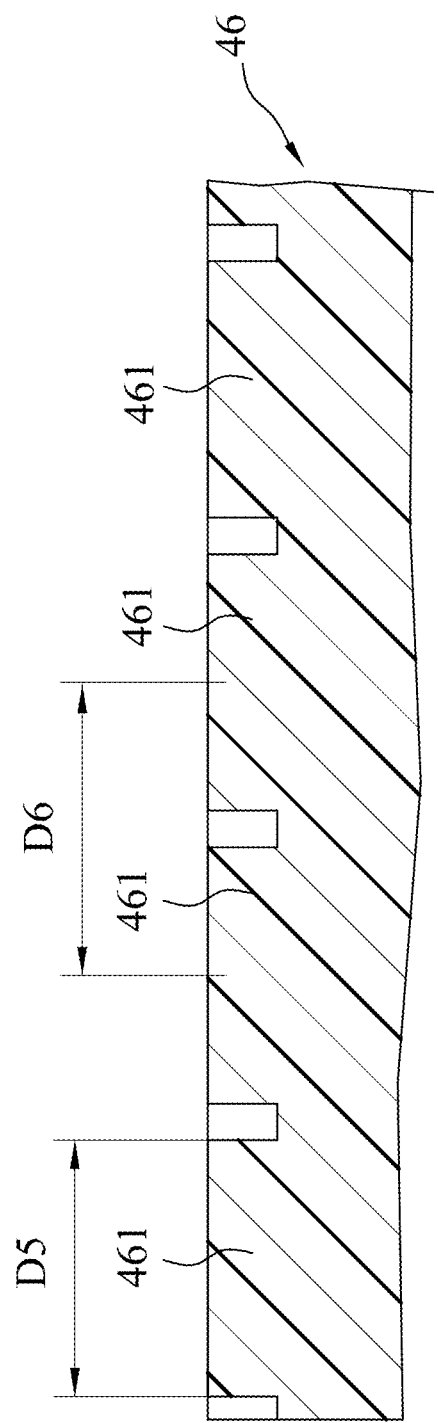
FIG. 8 is a fragmentary sectional view of a template used for manufacturing the silicon mold.
Figure 9:
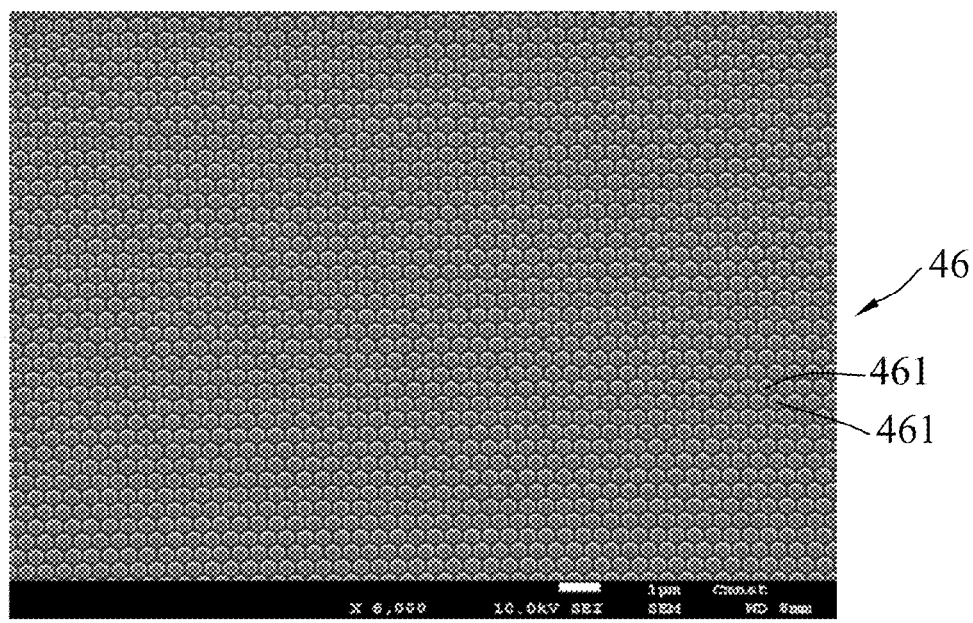
FIG. 9 is an SEM image of the template.

Referring to FIGS. 5, 8 and 9, the template 46 thus obtained has a plurality of template spots 461 that are arranged in a honeycomb array and that respectively correspond in position to the cavities 32 of the silicon mold 31. Each of the template spots 461 has a diameter (D5) ranging from 315 nm to 385 nm. In this embodiment, the diameter (D5) of each of the template spots 461 is exemplified to be 350 nm. A center-to-center distance (D6) between two adjacent ones of the template spots 461 ranges from 405 nm to 495 nm, and is exemplified to be 450 nm in this embodiment.

Figure 10:
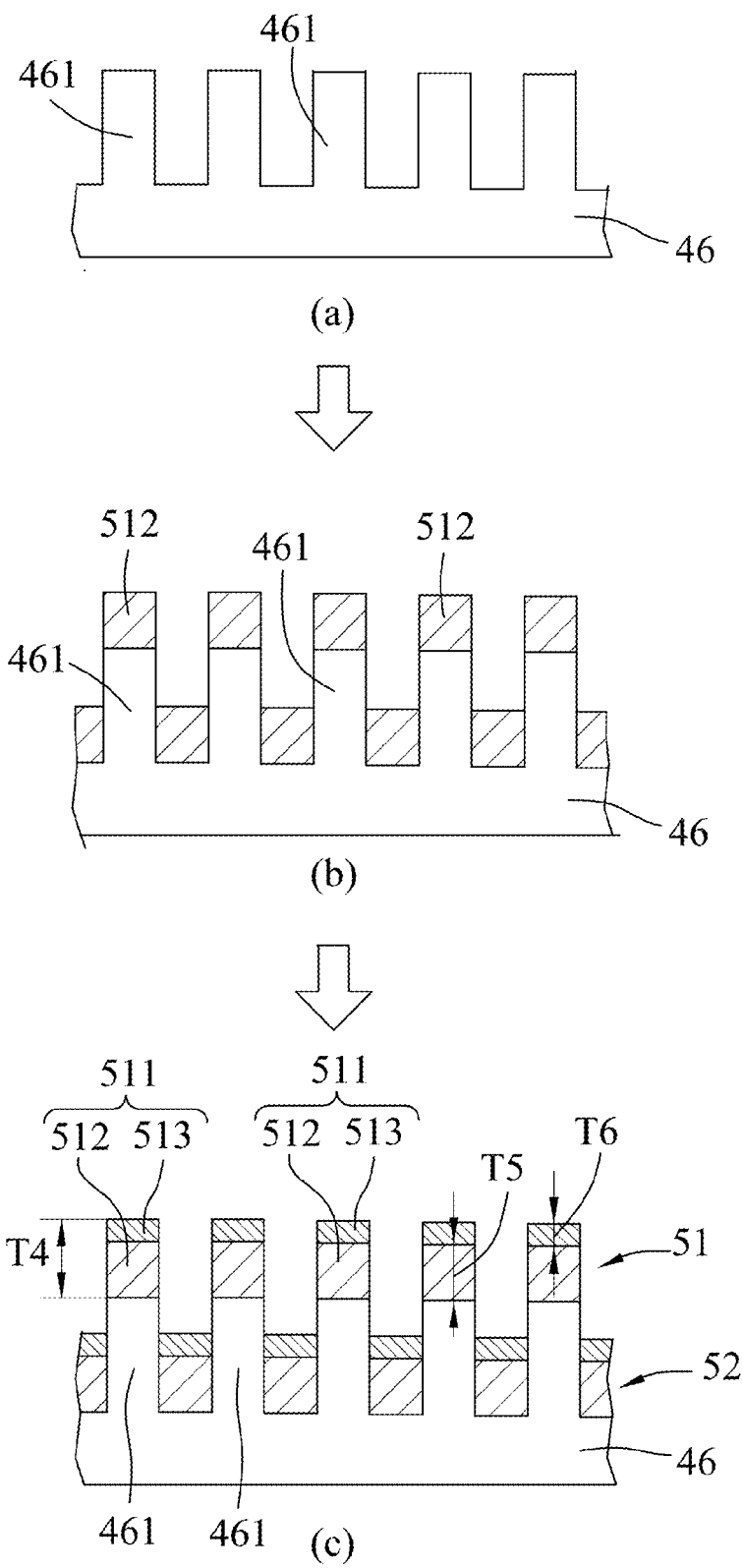
FIGS. 10 to 13 show consecutive steps of the method of manufacturing the exemplary embodiment.

Referring to FIGS. 5 and 10, in the first deposition step 23, a transfer metal layer 51 and a deposited metal layer 52 are deposited and formed on the template 46.

The transfer metal layer 51 has a plurality of metal spots 511 disposed respectively on the template spots 461. The deposited metal layer 52 is formed in the spaces among the template spots 461. As shown in part (b) of FIG. 10, in this embodiment, a first metal layer (e.g., a gold layer) is first deposited on the template 46. As shown in part (c) of FIG. 10, a second metal layer (e.g., one of a chromium layer and a titanium layer) is then deposited on the first metal layer to form the transfer metal layer 51 and the deposited metal layer 52 composed of the first metal layer and the second metal layer. In this embodiment, the second metal layer is exemplified to be made of chromium. Each of the metal spots 511 of the transfer metal layer 51 has a thickness (T4) ranging from 31 nm to 39 nm, and is exemplified to be 35 nm in this embodiment. In each of the metal spots 511 of the transfer metal layer 51, the first metal layer constitutes a first transfer sub-layer 512 having a thickness (T5) ranging from 23 nm to 27 nm, and the second metal layer constitutes a second transfer sub-layer 513 having a thickness (T6) ranging from 8 nm to 12 nm. In this embodiment, the thickness (T5) of the first transfer sub-layer 512 is exemplified to be 25 nm, and the thickness (T6) of the second transfer sub-layer 513 is exemplified to be 10 nm. The deposited metal layer 52 has a structure similar to that of the transfer metal layer 51.

Figure 11:
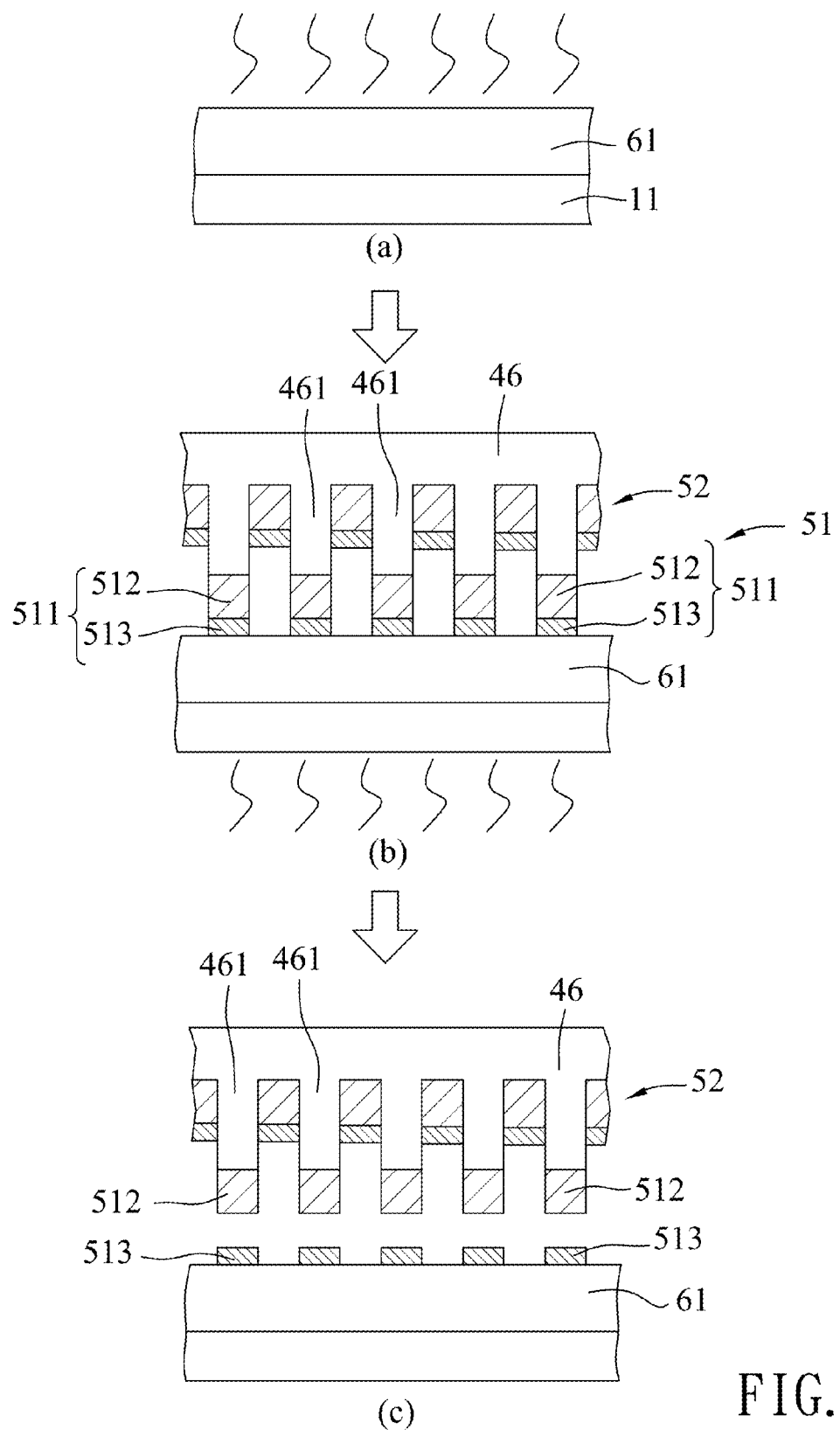

Referring to FIG. 5 and part (a) of FIG. 11, in the glass substrate providing step 24, a photoresist layer 61 is formed on a glass substrate 11. Specifically, a photoresist solution, such as AZ® 1500 series (AZ® 1505 is used in this embodiment) commercially available from AZ Electronic Materials plc (now part of the Merck Group) is spin coated on the glass substrate 11, followed by baking the coated photoresist solution at 110° C. to form the photoresist layer 61.

Referring to FIG. 5 and parts (b) and (c) of FIG. 11, in the transferring step 25, the second transfer sub-layer 513 of each of the metal spots 511 is transferred onto the photoresist layer 61. Specifically, transferring of the second transfer sub-layers 513 of the metal spots 511 is conducted by pressing the template 46 against the photoresist layer 61 using a bonding machine under a pressure ranging from 0.08 Mpa to 0.09 Mpa and heating the photoresist layer 61 to a glass transition temperature of the photoresist layer 61. In this embodiment, the pressing pressure is exemplified to be 0.085 Mpa, and the heating temperature is exemplified to be 150° C.

It is worth mentioning that the bonding strength between chromium and the photoresist layer 61 is stronger than the bonding strength between chromium and gold. Therefore, in this embodiment, the choice of the material for the first and second transfer sub-layers 512 of the metal spots 511, i.e., gold and chromium, would facilitate the detachment of the second transfer sub-layers 513 from the first transfer sub-layers 512 and assure strong bonding between the second transfer sub-layers 513 and the photoresist layer 61. In addition, when heating the photoresist layer 61 to its glass transition temperature, the photoresist layer 61 is softened and becomes viscous, and thus has greater adhesion to the second transfer sub-layers 513.

In certain embodiments, the first transfer sub-layers 512 may be omitted as long as the second transfer sub-layers 513 can be successfully detached from the template 46 and transferred onto the photoresist layer 61.

Figure 12:
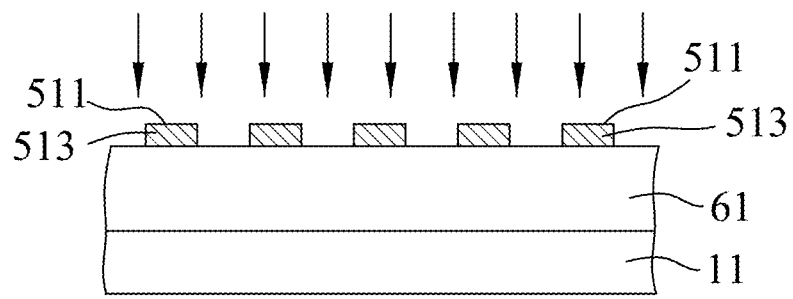
Figure 12:
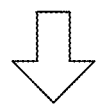
Figure 12:
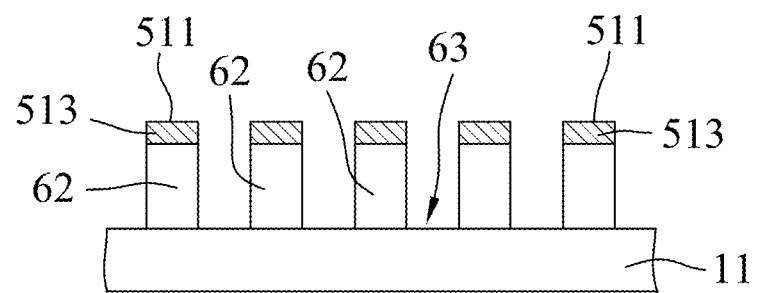
Figure 14:
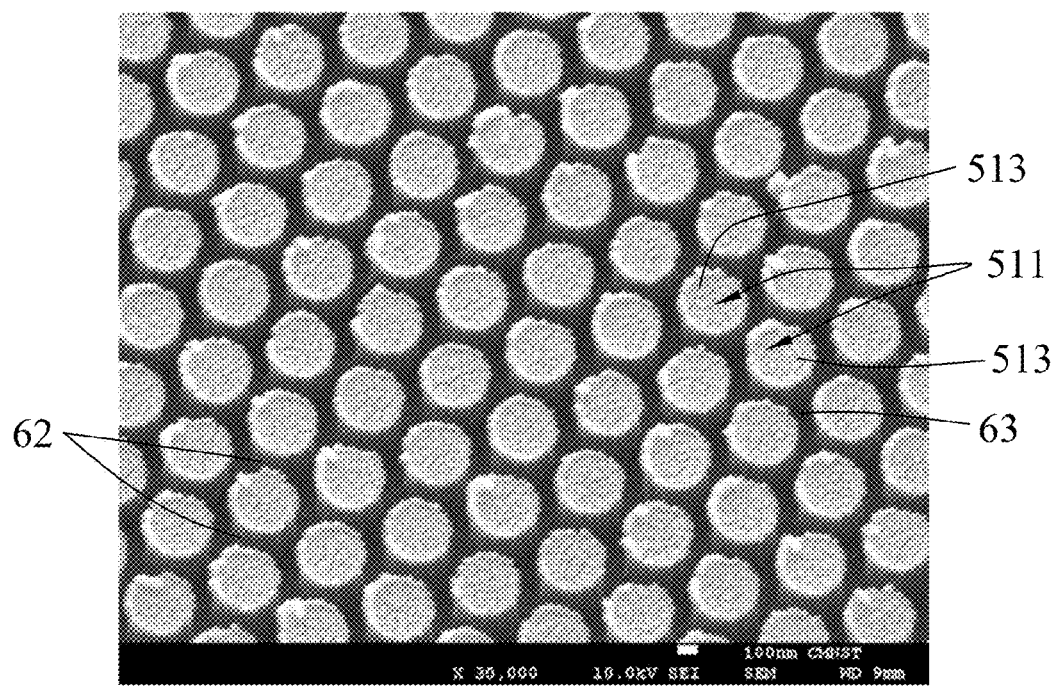
FIG. 14 is an SEM image showing, after an etching step, a plurality of photoresist spots respectively underlying a plurality of metal spots.

Referring to FIGS. 5 and 12, in the etching step 26, the photoresist layer 61 exposed from the second transfer sub-layers 513 of the metal spots 511 is etched, such that photoresist spots 62 respectively underlying the second transfer sub-layers 513 are left on the glass substrate 11 and ring-shaped spaces 63 are formed on the glass substrate 11 around the photoresist spots 62. The etching may be conducted using an oxygen plasma etching machine, such as a reactive ion etching machine commercially available from Gang Sheng Technology Co., LTD. As shown in FIG. 14, each of the second transfer sub-layers 513 and its corresponding photoresist spot 62 are cylindrical in shape.

Figure 13:
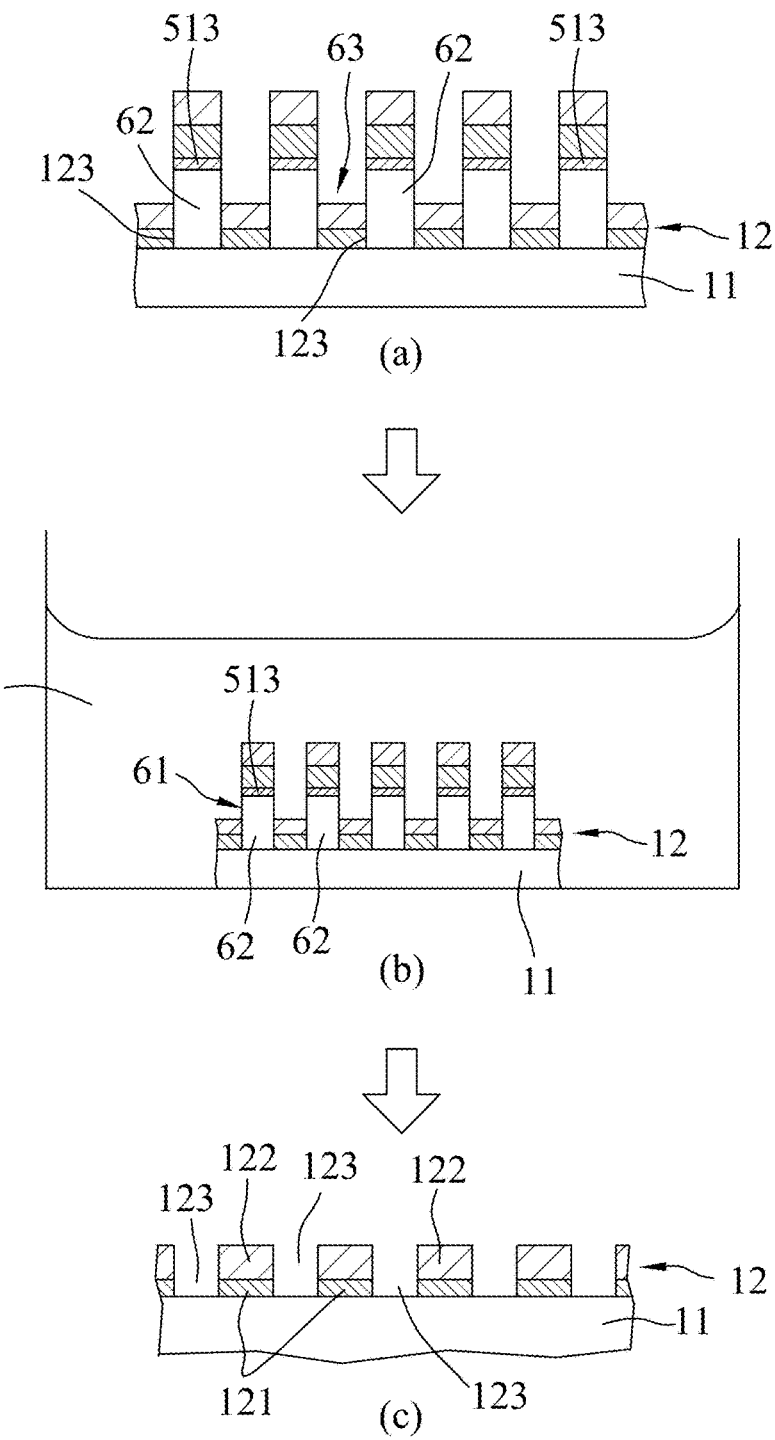

Referring to FIG. 5 and part (a) of FIG. 13, in the second deposition step 27, the periodic metal layer 12 is formed on the glass substrate 11 such that the periodic metal layer 12 fills the ring-shaped spaces 63.

Specifically, the periodic metal layer 12 is formed by first depositing the first metal sub-layer 121 that is made of one of chromium and titanium (chromium in this embodiment), followed by depositing the second metal sub-layer 122 that is made of gold.

Referring to FIGS. 2, 3 and 5, and parts (b) and (c) of FIG. 13, in the removing step 28, the photoresist spots 62, the second transfer sub-layers 513 formed on the photoresist spots 62 and the metal formed on the second transfer sub-layers 513 in the second deposition step 27 are removed so as to form the round holes 123 that are arranged and aligned along three intersecting lines lying in a two dimensional plane. The removing step 28 may be conducted by dissolving the photoresist spots 62 in an acetone solution 90.

It is easier to use the template 46 having the cylindrical template spots 461 to form the energy-saving glass having the round holes 123 since the circular design will result in a more uniform stress distribution on the edge of the first metal sub-layer 121 and the second metal sub-layer 122 surrounding the round holes 123. In the case where the template 46 is a soft template, manufacturing errors and the errors imposed by the contaminants may be alleviated. Moreover, the soft template is more flexible and durable compared to a rigid template.

Figure 15:
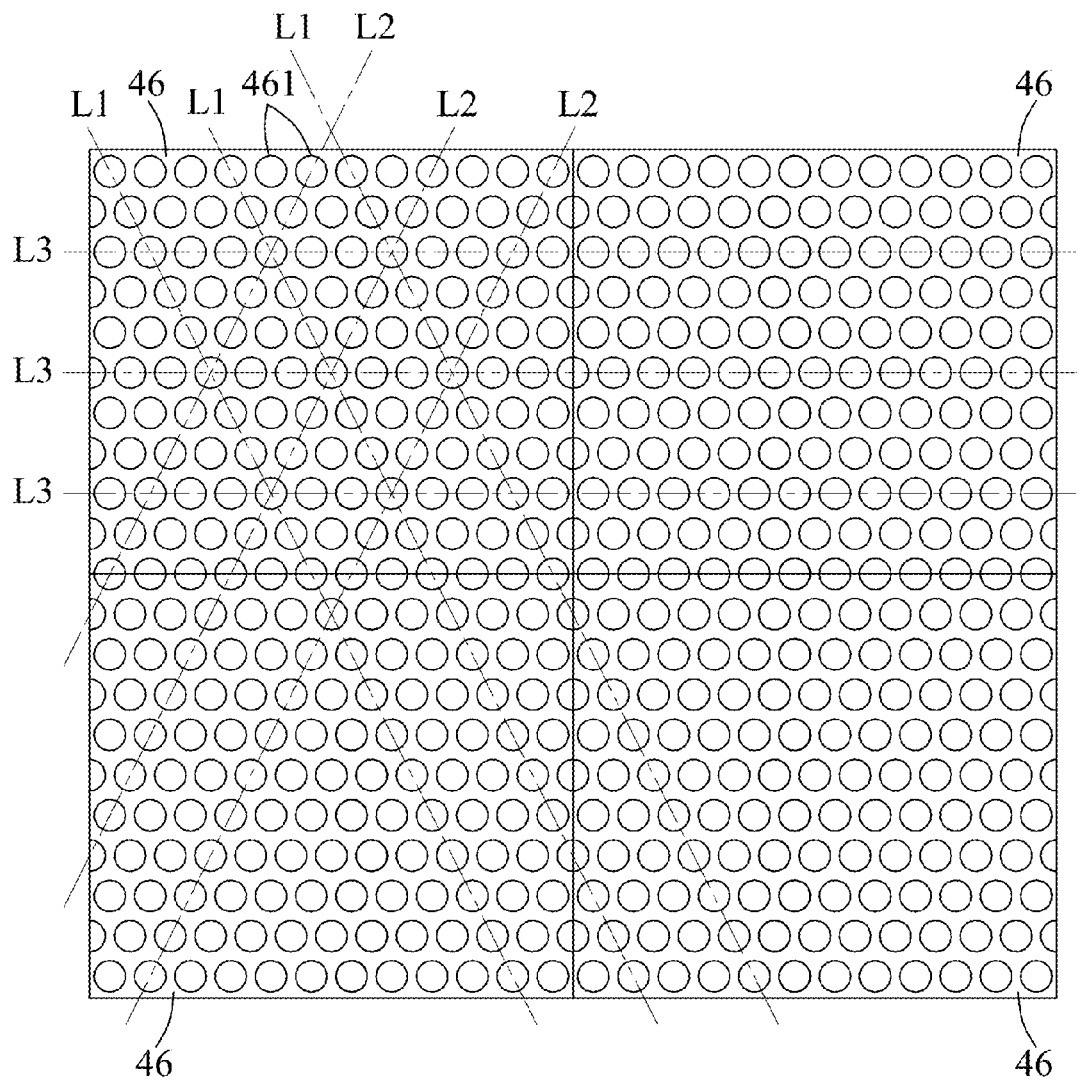
FIG. 15 shows a plurality of the templates connected together used for forming a periodic metal layer of the exemplary embodiment.

Referring to FIG. 15 with reference to FIGS. 1 and 11, in certain embodiments, a plurality of the templates 46 (only four is shown in FIG. 15) may be used to form the periodic metal layer 12 on the glass substrate 11 with a relatively large size. Each of the templates 46 has the template spots 461 arranged in a honeycomb array.

The template spots 461 of each of the templates 46 are arranged and aligned along the parallel first lines (L1), the parallel second lines (L2) and the parallel third lines (L3). Only three of the first lines (L1), three of the second lines (L2) and three of the third lines (L3) are shown in FIG. 15 for illustrative purpose. Each of the template spots 461 of the templates 46 is located at an intersection of one of the first lines (L1), one of the second lines (L2) and one of the third lines (L3). The templates 46 are connected to each other before the second transfer sub-layers 513 of the metal spots 511 are transferred from the template spots 461 onto the photoresist layer 61. Compared to the rigid templates, the soft templates 46 are less likely to be damaged when being connected to each other. By use of the plurality of the templates 46 and connection of the templates 46 together, a large machine to manufacture a large silicon mold 31 is not necessary so as to save costs for the large machine.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An energy-saving glass comprising:
   a glass substrate; and
   a metal layer deposited on said glass substrate and having a honeycomb array of round holes,
   wherein said metal layer further has a first metal sub-layer disposed on said glass substrate and made of one of chromium and titanium, and a second metal sub-layer disposed on said first metal sub-layer and made of gold, said first metal sub-layer and said second sub-layer cooperatively defining said round holes.

2. The energy-saving glass as claimed in claim 1, wherein each of said round holes has a diameter ranging from 315 nm to 385 nm, a center-to-center distance of two adjacent ones of said round holes ranging from 405 nm to 495 nm, said metal layer having a thickness ranging from 88 nm to 112 nm.

3. The energy-saving glass as claimed in claim 1, wherein said first metal sub-layer has a thickness ranging from 8 nm to 12 nm, said second metal sub-layer having a thickness ranging from 80 nm to 100 nm.

4. A method of manufacturing an energy-saving glass, the energy-saving glass comprising: a glass substrate; and a metal layer deposited on said glass substrate and having a honeycomb array of round holes, wherein said metal layer further has a first metal sub-layer disposed on said glass substrate and made of one of chromium and titanium, and a second metal sub-layer disposed on said first metal sub-layer and made of gold, said first metal sub-layer and said second sub-layer cooperatively defining said round holes, wherein the method comprising the steps of:
   (a) providing at least one template having a plurality of template spots that are arranged in a honeycomb array;
   (b) forming on the template a transfer metal layer that has a plurality of metal spots disposed respectively on the template spots;
   (c) forming on the glass substrate a photoresist layer;
   (d) transferring the metal spots from the template spots onto the photoresist layer;
   (e) etching the photoresist layer exposed from the metal spots such that photoresist spots respectively underlying the metal spots are left on the glass substrate and ring-shaped spaces are formed on the glass substrate around the photoresist spots;
   (f) forming by deposition the metal layer on the glass substrate such that the metal layer fills the ring-shaped spaces; and
   (g) removing the photoresist spots and the metal spots so as to form the honeycomb array of round holes.

5. The method of manufacturing the energy-saving glass as claimed in claim 4, wherein the template is formed using a silicon mold having a plurality of cavities that respectively correspond in position to the template spots of the template.

6. The method of manufacturing the energy-saving glass as claimed in claim 5, further comprising pouring a polymer solution onto the silicon mold, followed by curing the polymer solution to form the template, and releasing the template from the silicon mold, wherein the polymer solution includes polydimethylsiloxane; and wherein the template is a soft template.

7. The method of manufacturing the energy-saving glass as claimed in claim 4, wherein, transferring of the metal spots is conducted by pressing the template against the photoresist layer under a pressure ranging from 0.08 Mpa to 0.09 Mpa and heating the photoresist layer to a glass transition temperature of the photoresist layer.

8. The method of manufacturing the energy-saving glass as claimed in claim 4, wherein the transfer metal layer is formed by depositing on the template a gold layer, followed by depositing one of a chromium layer and a titanium layer on the gold layer.

9. The method of manufacturing the energy-saving glass as claimed in claim 4, wherein the metal layer is formed by first depositing the first metal sub-layer that is made of one of chromium and titanium, followed by depositing the second metal sub-layer that is made of gold.

10. The method of manufacturing the energy-saving glass as claimed in claim 9, wherein:

the first metal sub-layer is made of chromium and has a thickness ranging from 8 nm to 12 nm;

the second metal sub-layer has a thickness ranging from 80 nm to 100 nm;

each of the round holes has a diameter ranging from 315 nm to 385 nm ; and a center-to-center distance between two adjacent ones of the round holes ranges from 405 nm to 495 nm.

11. The method of manufacturing the energy-saving glass as claimed in claim 4, wherein:

the at least one template includes a plurality of templates, each of the templates having the template spots aligned along three intersecting lines lying in a two dimensional plane; and the templates are connected to each other before the metal spots are transferred from the template spots onto the photoresist layer.

* * * * *